Aug. 20, 1940.                 C. W. PARRIS                 2,211,983
                    HIGH PRESSURE JOINT FOR TUBES AND THE LIKE
                    Filed Nov. 4, 1937              4 Sheets-Sheet 1
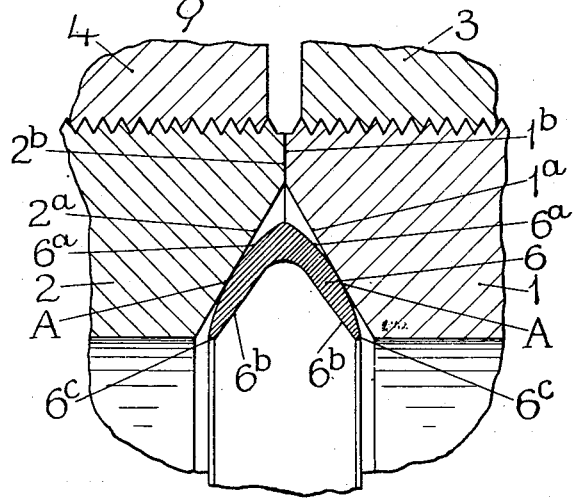
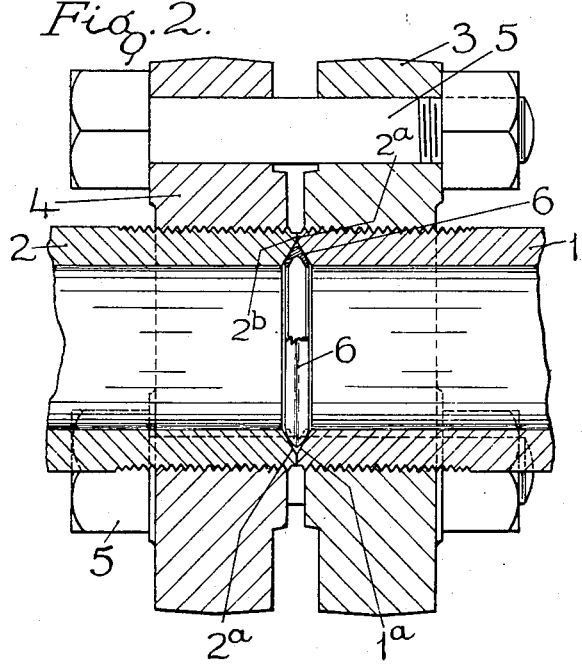
INVENTOR
CYRIL WRIGHT PARRIS
BY
Norris & Bateman
ATTORNEYS Aug. 20, 1940.  C. W. PARRIS  2,211,983
HIGH PRESSURE JOINT FOR TUBES AND THE LIKE
Filed Nov. 4, 1937  4 Sheets-Sheet 2
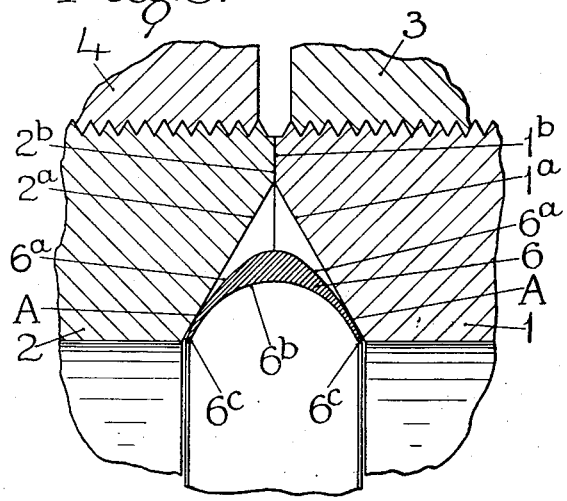
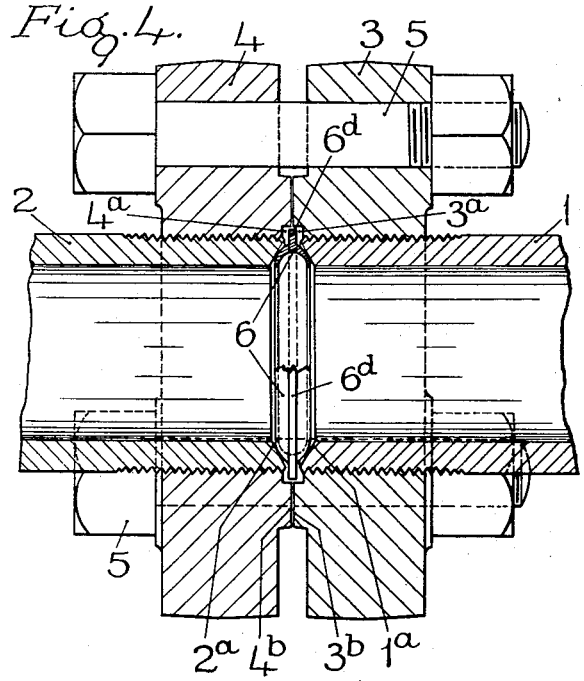
INVENTOR
CYRIL WRIGHT PARRIS
BY
Norris & Bateman
ATTORNEYS Aug. 20, 1940. C. W. PARRIS 2,211,983
HIGH PRESSURE JOINT FOR TUBES AND THE LIKE
Filed Nov. 4, 1937 4 Sheets-Sheet 3
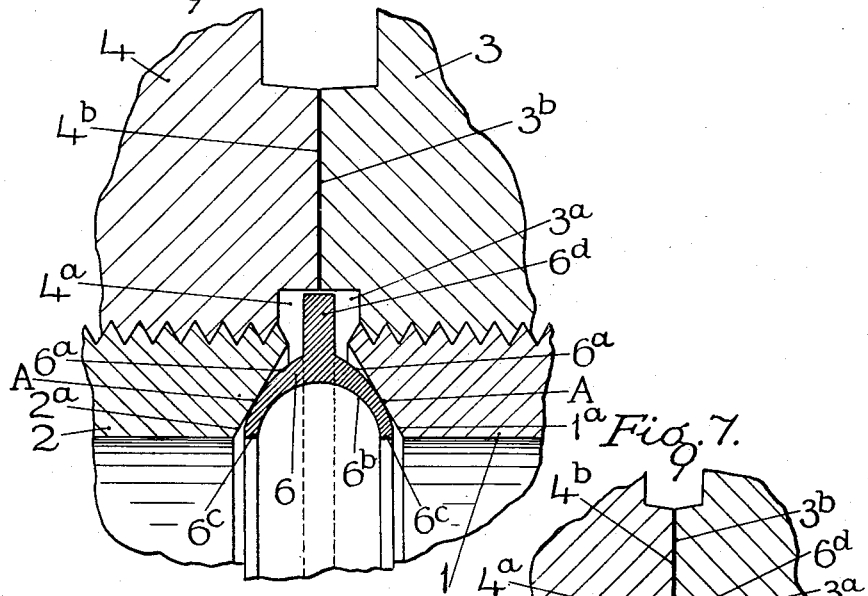
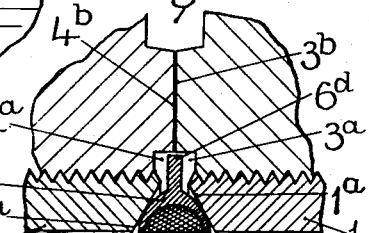
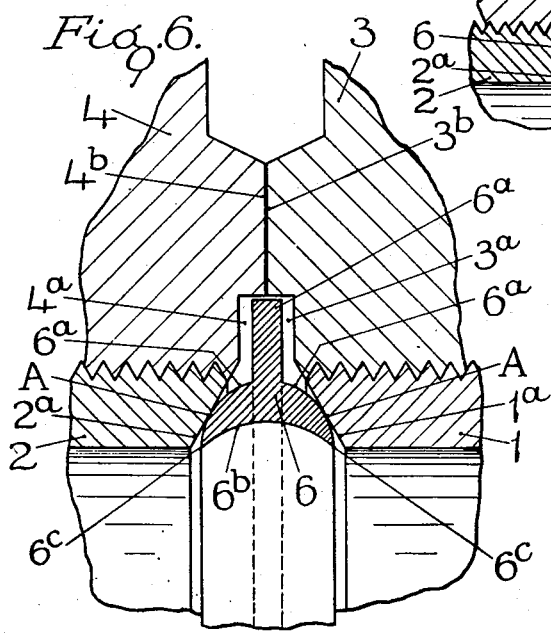
INVENTOR
CYRIL WRIGHT PARRIS
BY Norris & Bateman
ATTORNEYS Aug. 20, 1940.  C. W. PARRIS  2,211,983
HIGH PRESSURE JOINT FOR TUBES AND THE LIKE
Filed Nov. 4, 1937  4 Sheets-Sheet 4
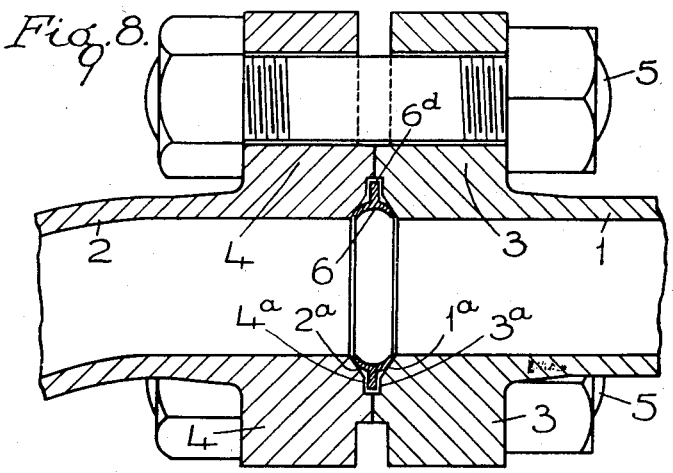
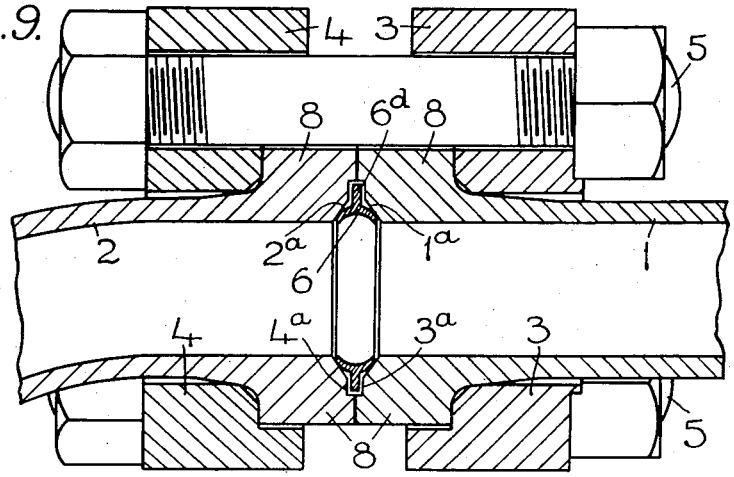
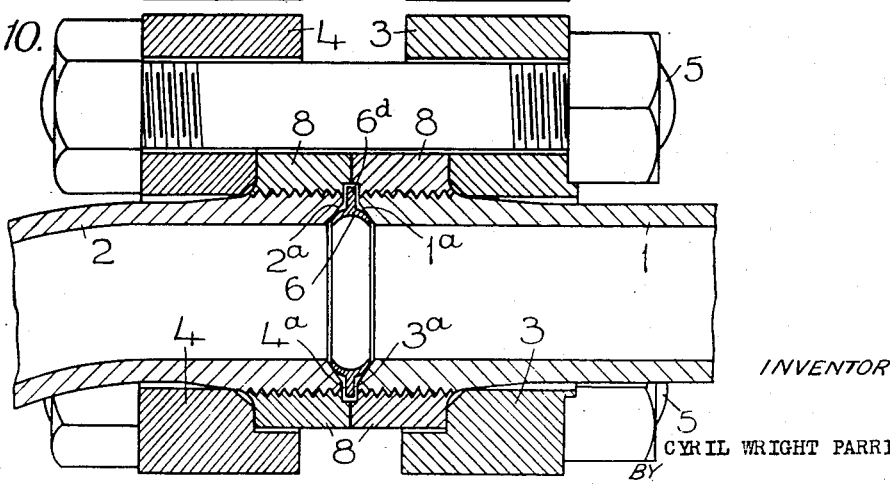
INVENTOR
CYRIL WRIGHT PARRIS
BY
Norris & Bateman
ATTORNEYS Patented Aug. 20, 1940

2,211,983

UNITED STATES PATENT OFFICE 2,211,983

HIGH PRESSURE JOINT FOR TUBES AND THE LIKE

Cyril Wright Parris, Wakefield, England, assignor to E. Green & Son, Limited, Wakefield, Yorkshire, England, a British company Application November 4, 1937, Serial No. 172,789
In Great Britain November 14, 1936

2 Claims. (Cl. 285—130)

This invention relates to high pressure joints of the type in which the ends of the parts to be connected are formed with angled edges, and the sealing engagement is effected at opposite outer surfaces of a hard metal lens ring provided with oblique curved surfaces or a hard metal cup ring, the internal surfaces of which are exposed to the high-pressure, the outer surfaces being convex to the corresponding seating surfaces of the parts to be joined to provide line or band contact at the contacting points.

In both cases the parts to be joined together were tightened together to squeeze the lens ring or cup ring, and over tightening could take place, and it has been found with the lens ring that in tightening up of the joint, it can be stressed above the elastic limit and deformation of the joint face takes place on the end of the members and refacing is necessary when the joint has to be re-made, and in the case of the cup ring excessive deformation of the ring could take place, and it was proposed to employ an internal ring within the cup ring to safeguard against distortion of the cup ring beyond the elastic limit.

Further in the case of the cup ring, the ring was made thinner at the outer edge (that is the outer circumference of the ring), and the inner edges were thickened considerably and the line contact with the oblique surfaces was effected at the thickened inner edges, and this thinning of the outer edge leads to a dangerous concentration of stress at this point.

The object of this invention, which is particularly applicable to joints of tubes, is to overcome these disadvantages by preventing excessive deformation of the ring and to construct the cup ring whereby uniform deformation and uniform stress is obtained.

According to this invention, the ends of the tubular members to be connected are so constructed or means applied, and the joint ring of cup or U section hereinafter referred to as the cup ring, is of such shape and thickness that when the joint is fully tightened up, the cup ring is just nipped between the cone faces of the tubular members, so that the material in the ring cannot be unduly stressed.

The cup ring and joint surfaces are so constructed that the contact points or bands come within a suitable distance from the inner edge to the outer periphery of the ring.

The thickness of the wall of the cup ring is graduated to be proportional to the square root of the distance from the contact point or band outwards. By this means uniform deformation is obtained and unequal stress avoided.

A stiffening extension ring or projection or projections may be employed at the junction of the curved surfaces formed on the cup ring and integral therewith.

The invention will be clearly understood from the following description aided by the accompanying drawings in which:

Figure 1 is a sectional view of a portion of the ends of two tubes and cup ring showing one example.

Figure 2 is a sectional view on a reduced scale of the ends of two tubes and cup ring according to the example shown in Figure 1.

Figure 3 is a similar view to Figure 1 but showing a second example of cup rings.

Figure 4 is a sectional elevation of the ends of two tubes and a cup ring showing a third example.

Figure 5 is a detail section on an enlarged scale of part of Figure 4.

Figure 6 is a similar view to Figure 5 showing a fourth example.

Figure 7 is a similar view showing a modification, and

Figures 8 to 10 are sections showing other modifications.

As one example of carrying the invention into effect, and as shown in Figures 1, 2 and 3 of the accompanying drawings, the end of each tube 1, 2, is formed with an oblique or cone surface 1a, 2a extending from the inner circumference of the tube to the end face at a little distance from the outer circumference leaving a flat annular face 1b, 2b on the tube end.

The tubes 1, 2 may be connected together end on by any suitable means, such as flanges 3, 4 screwed onto the ends of the tubes 1, 2, said flanges 3, 4 being clamped together by bolts 5 and nuts, and the cup ring 6 is of such a thickness that when the bolts 5 or other means connecting the tubes 1, 2 together are tightened for the flat annular faces 1b, 2b on the ends of the tubes 1, 2 to butt together, the cup ring 6 is nipped between the cone or oblique faces 1a, 2a, it being impossible to further tighten up the tubes 1, 2 after the annular faces 1b, 2b have contacted with each other.

The cup ring in one example as shown in Figures 1 and 2 is formed with convex outer faces 6a, 6a and flat inside faces 6b, 6b forming an internal V-shaped recess, and with the inside edges 6c, 6c comparatively thin so that when positioned between the cone shaped faces 1a, 2a of the tubes 1, 2 the lines or bands of contact A are at suitable points inside the inner edges of the ring, for instance, are inside the extreme inner third of the semi-periphery.

In the example shown in Figure 3 the ring 6 is formed with convex outer faces 6a, 6a and with a semi-circular or curved inside face 6b so that the inside walls are comparatively thin and the outside wall comparatively thick.

In the examples shown in Figures 4 to 7 the cup ring 6 is formed with an extension ring 6d at the junction of the curved surfaces 6a, 6a, and the faces of the flanges 3, 4 next to the tubes 1, 2 are formed with recesses 3a, 4a and the diameter of the recesses is made suitable to receive the stiffening extension ring 6d on the cup ring 6 so that the ring 6 is centred by this means on the coned faces 1a, 2a of the tube ends. In these examples the flat annular faces 1b, 2b on the tube ends are dispensed with and the flanges 3, 4 are formed with the flat abutting 3b, 4b which project beyond the recesses 3a, 4a and the ends of the tubes 1, 2, and the coned faces 1a, 2a may extend to the periphery of the tubes as shown in Figures 4 and 5, or to the outer edges of the recesses 3a, 4a as shown in Figure 6.

The provision of the stiffening extension ring 6d is additional to the cup portion of the ring 6 but is not intended to provide uniformity of stress when compressing the ring 6. The object of this extension ring 6a is, however, twofold, i. e. to provide radial stiffness and centralisation.

Although in the examples illustrated in Figures 1 to 7 of the drawings, the flanges 3, 4 are shown screwed onto the ends of the tubes 1, 2, it must be understood that this is only by way of example and such flanges can be welded on or formed solid with the tubes as shown in Figure 8, or connected to them in any other suitable manner, or any other means may be employed for connecting the ends of the tubes together, such as for example as shown in Figure 9 by forming collars 8, 8 on the ends of the tubes 1, 2 and employing loose flanges 3, 4 engaging with the collars 8, 8, or the collars may be welded on the tubes 1, 2, or as shown in Figure 10 screwed or otherwise fixed thereon.

To ensure that the cup ring 6 is just nipped between the joint faces 1a, 2a the joint faces are machined in correct relation to the abutting faces when the flanges are formed solid with the tubes 1, 2. Alternatively, the screwed flanges carrying the abutting faces may be turned round to cause the abutting faces to approach or recede with respect to the joint faces, and thus provide accurate adjustment, and in the case of the collars, which may be of any suitable material, the adjustment can be obtained by machining or movement on the thread.

When a cup ring provided with the extension ring 6d is employed, the recess for same may be formed in the flat annular faces 1b, 2b at the ends of the tubes 1, 2, instead of in the flanges, or may be in the collars, or the coned faces 1a, 2a may be of such a depth that the extension ring 6d is located in the apex of the coned ends.

The rings 6 may be constructed of any suitable metal and the space inside the rings 6 may be filled with rubber 7 (Figure 7), pitch, bitumen or the like, or partially filled with such material to prevent formation of an air pocket inside the ring without prejudice to the action of the internal pressure on the flexible inner edges 6c, 6c of the ring.

In use, a ring 6 is positioned between the coned faces 1a, 2a of the ends of two tubes 1, 2 and the tubes tightened together until the flat annular faces 1b, 2b or 3b, 4b are abutting and just nipping the ring 6 on the contact lines or bands A. The internal pressure acting on the flexible inner edges 6c, 6c of the ring 6 will force them into contact with the joint faces 1a, 2a thus forming a fluid-tight joint without excessive tension on the bolts or connecting means between the tubes.

What I do claim as my invention and desire to secure by Letters Patent is:

1. A high pressure joint for tubes comprising a pair of tube elements having a pair of opposed conical surfaces at their joined ends and provided with means for drawing said surfaces toward one another, and an internally cupped metal ring having a convex exterior surface making a normal line contact with each of said conical surfaces, the walls of said ring being of reduced thickness toward their inner edges to provide uniformity of stress in the ring when nipped at its lines of contact with said conical surfaces.

2. A high pressure joint comprising tubular members provided at their ends with a pair of opposed conical surfaces and having means for drawing said surfaces toward one another, an annular recess being provided which extends outwardly from said conical surfaces, and a cupped metal ring having lateral exterior convex surfaces to contact with the respective conical surfaces and having a peripheral extension from the junction of its exterior surfaces to stiffen the ring, said extension being of a dimension to project loosely into said annular recess, when the conical surfaces are drawn toward one another to make the joint, to center the ring with respect to said conical surfaces.

CYRIL WRIGHT PARRIS.